Sept. 18, 1956 J. E. JACOBS 2,763,787
INSPECTION DEVICE
Original Filed March 3, 1952 2 Sheets-Sheet 1
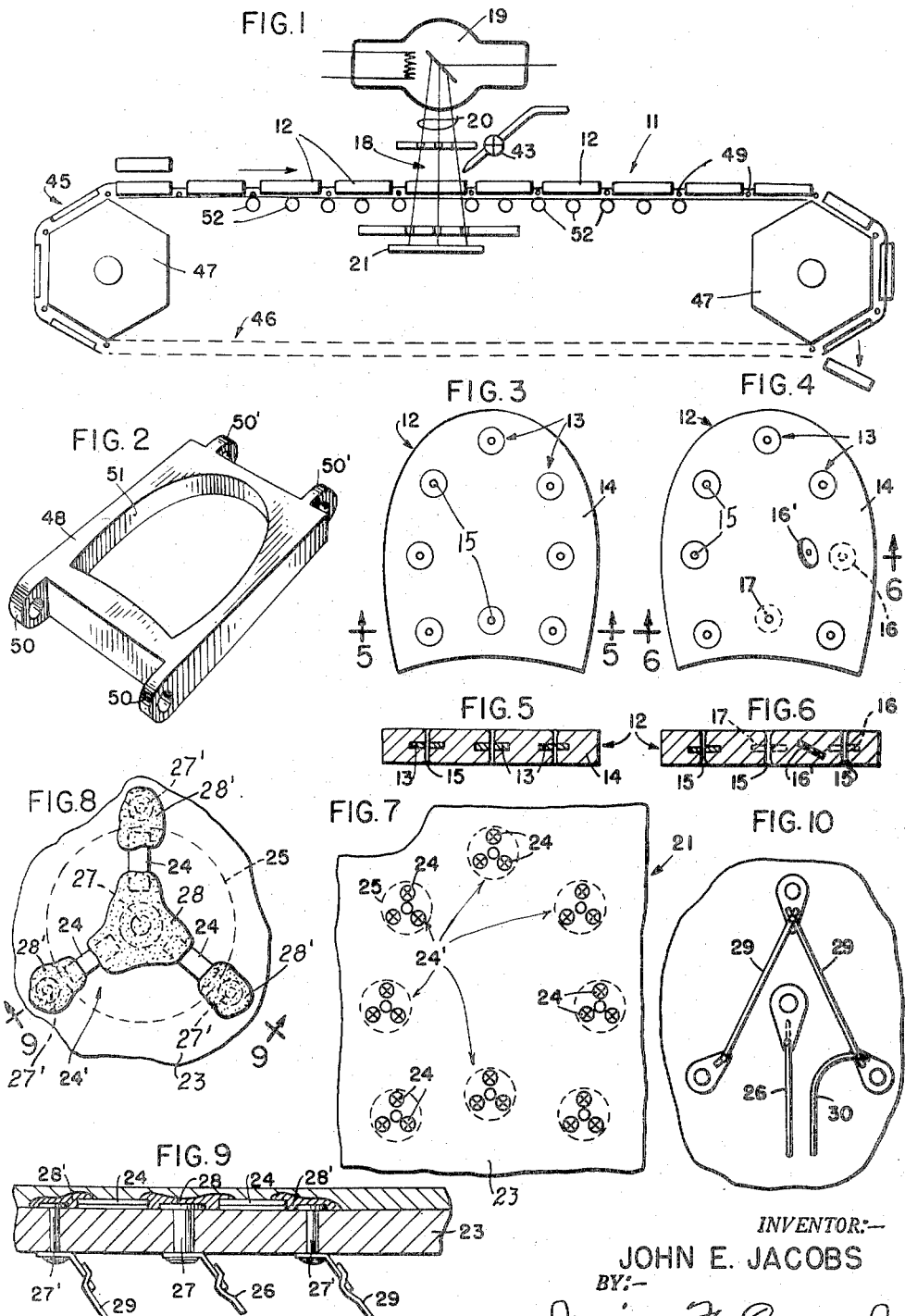
INVENTOR:—
JOHN E. JACOBS
BY:—
Junius F. Cook, Jr.
ATT'Y Sept. 18, 1956  J. E. JACOBS  2,763,787
INSPECTION DEVICE
Original Filed March 3, 1952  2 Sheets-Sheet 2

INVENTOR:—
JOHN E. JACOBS
BY:—
Junius F. Cook, Jr.
ATT'Y

United States Patent Office 2,763,787
Patented Sept. 18, 1956

2,763,787

INSPECTION DEVICE

John E. Jacobs, Milwaukee, Wis., assignor to General Electric Company, a corporation of New York Original application March 3, 1952, Serial No. 274,621. Divided and this application April 23, 1953, Serial No. 350,551

9 Claims. (Cl. 250—83.3)

The present invention relates in general to inspection apparatus, and has more particular reference to equipment for determining the precise location of an insert or inserts enveloped, embedded or otherwise contained in an inspection article, the invention pertaining especially to apparatus for determining whether or not inserts, such as nail holding washers, are correctly located, each in its desired position in a molded body or article, such as a rubber heel for shoes, the invention, of course, in its broader aspects being not necessarily limited to the location of nail holding washers in rubber heels, but being applicable to the inspection of inserts of any shape or character, enveloped or enclosed in any inspection article, so long as the constituent material of the insert or inserts and the material of the inspection article, in which the inserts are enclosed, have unlike ray absorbing characteristics. The invention comprises subject matter divided from a copended application for United States Letters Patent, Serial No. 274,621, filed March 3, 1952.

An important object of the invention is to provide penetrating ray apparatus for scanning an article to determine the presence or absence of an inserted body or bodies in precisely located position within the scanned article; a further object being to provide means for supporting the article to be examined at a scanning location or station, whereby to position an inserted body or bodies, in the article, in scanning position within a penetrating beam; a further object being to provide a ray sensitive element or elements, at the scanning station, in position, with respect to a properly located insert, to receive scanning rays penetrating the article at or in the vicinity of the insert, whereby to determine the presence of the insert exactly at or the displacement or complete absence thereof from a desired or predetermined insert position in the inspection article, in terms of the intensity of ray impingement on the sensitive element, after passing through the article.

Another important object is to provide apparatus for supporting an inspection article precisely in scanning position in a penetrating ray beam, whereby accurately to locate, in said beam, an insert enclosed in said article, said apparatus including a ray sensitive element disposed at said station in position to be screened from said ray beam by the insert, if the same be correctly located in the article being inspected.

A further object is to provide a plurality of sensitive elements spaced apart in accordance with the contour of the insert and all located in position to be screened by the insert, if correctly located in the inspection article, whereby, if the insert be incorrectly positioned in the article, one or more of the sensitive elements will be exposed to the ray beam without being screened by the insert.

Another important object of the invention is to provide apparatus of the character mentioned including a plurality of sensitive elements disposed in spaced relationship and each in registration with a corresponding correctly positioned insert carried by the inspection article when in scanning position at a scanning station; a further object being to provide a plurality of sensitive elements for each separate insert requiring detection in the inspection article.

Another important object of the invention is to provide penetrating ray apparatus for scanning articles in rapid succession to determine whether or not an insert or inserts carried by said articles is correctly located in a corresponding desired or predetermined position or positions in each article; a further object being to provide reject apparatus operable by or under the control of the sensitive scanning element or elements for indicating, marking, separating, or otherwise differentiating articles containing correctly located inserts from those in which the inserts are incorrectly placed.

Another important object is to provide for the successive inspection of the articles in apparatus of the character mentioned, wherein the articles follow one another at spaced intervals, including switch means for rendering the inspection equipment inoperative except when an article is in inspecting position at an inspection station in the penetrating ray beam, to thereby avoid false operation of the reject mechanism as the result of ray impingement on the sensitive element or elements during an interval when an inspection article is leaving and a successive article is entering the inspection station.

Another important object is to provide inspection equipment comprising a suitable source of penetrating rays, such as X-rays, and ray sensitive detecting means spaced from the source and arranged to discriminate between relatively small changes in ray intensity reaching the detecting means through an article being inspected either directly or through an insert or inserts carried in the article and having ray absorbing characteristics differing from that of the material of the article, and conveyor means for traversing articles to be inspected to and through a precisely located inspection station in the ray beam between the ray source and the detecting means, the detecting means being located in registration with inserts correctly positioned in the articles when the same are precisely located in inspecting position, at the inspection station, whereby the ray will pass to the detecting means only through the inserts, if the same be correctly located in the inspection article, and otherwise will pass to the detecting means along a path or paths unscreened by an incorrectly located insert or inserts, thereby allowing for differentiation between perfect and imperfect articles, in terms of the ray intensity impinging upon the detecting means after passing through or scanning the articles.

Another important object is to employ a suitable semiconductor material, such as cadmium or mercury sulphide, or cadmium selenide, as an X-ray sensitive detector for determining, in terms of variation in the electrical impedance of the sensitive material comprising the semiconductor, the slight changes in the intensity of X-rays impinging thereon, in passing through an insert in an article being examined, or in penetrating the article without passing through an insert therein; a further object being to provide suitable impedance controlled translation means for indicating such changes in ray intensity; a still further object being to utilize the ray responsive current carrying characteristics of the sensitive detector material for the control of operable equipment adapted to mark or otherwise differentiate between perfect and imperfect articles.

The foregoing and numerous other objects, advantages and inherent functions of the invention will become apparent as the same is more fully understood from the following description which, taken in conjunction with the accompanying drawings, discloses a preferred embodiment of the invention for the purpose of demonstrating the same.

Referring to the drawings:

Fig. 1 is a diagrammatic view of inspection apparatus embodying the present invention, including conveyor means for traveling inspection articles in succession to and through an inspection station for examination in accordance with the teachings of the present invention;

Fig. 2 is a perspective view of a portion of the conveyor means shown in Fig. 1;

Figs. 3 and 4 illustrate one type of inspection article, namely, a rubber heel for shoes which may be inspected in apparatus embodying the present invention;

Figure 11:
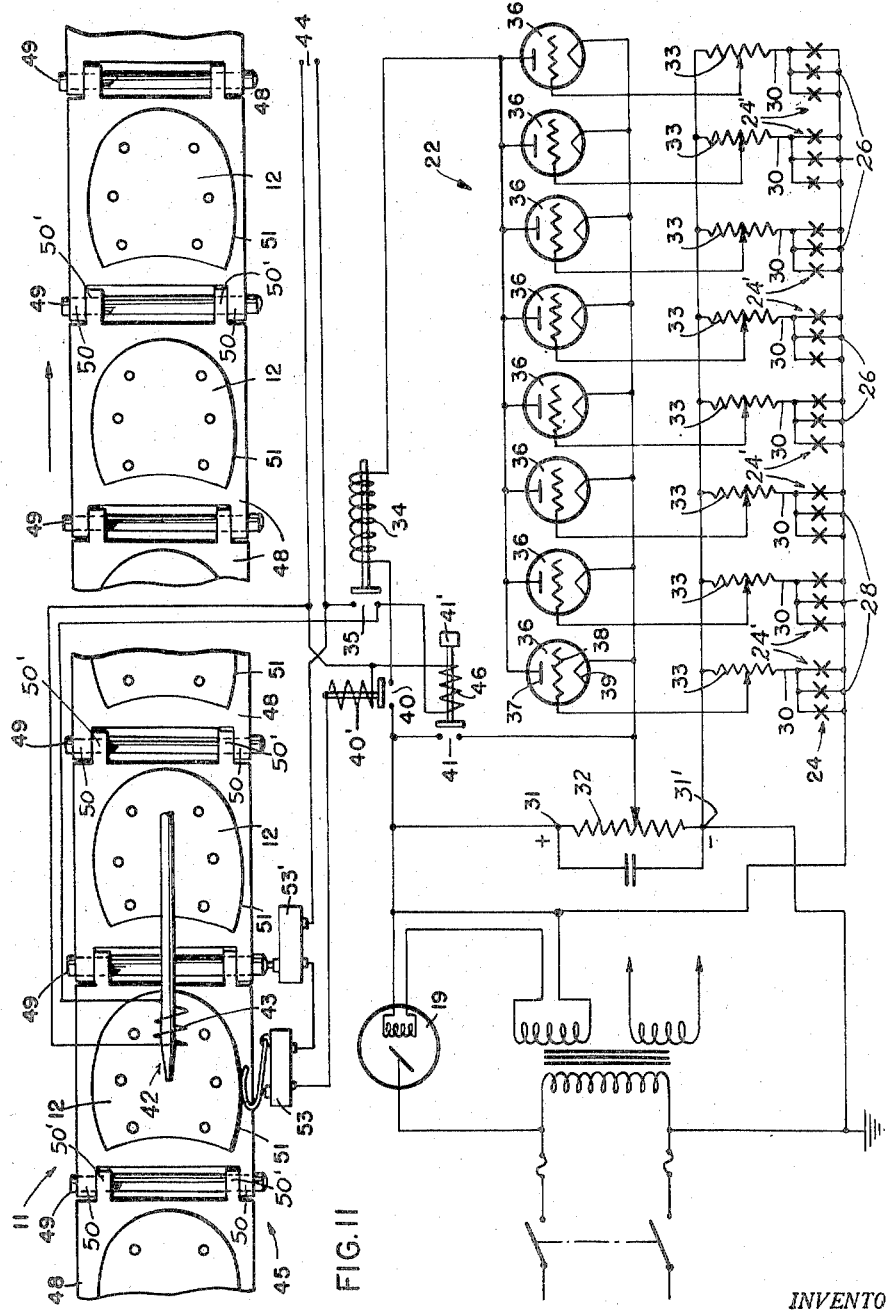

Figs. 5 and 6 are sectional views taken substantially along the lines 5—5 in Fig. 3, and 6—6 in Fig. 4, respectively;

Fig. 7 illustrates sensitive detector means which may be employed in apparatus for the inspection of articles of the sort shown in Figs. 3 and 4;

Fig. 8 is an enlarged view of a portion of the sensitive detector means shown in Fig. 7;

Fig. 9 is a sectional view taken substantially along the line 9—9 in Fig. 8;

Fig. 10 is a view showing the back side of the structure shown in Fig. 8; and

Fig. 11 is a diagram of electrical connections which may be employed in connection with the apparatus shown in Fig. 1.

To illustrate the invention, the drawings show apparatus 11 for inspecting articles 12 containing inserts 13, in order to determine whether or not the inserts are accurately located in precisely desired or predetermined positions in the article. The present invention, of course, is not necessarily limited to the inspection of any particular article, nor to the specific character of the insert or inserts carried by the article, but may, on the contrary, be applied to the inspection of any article containing an insert or inserts of any size, configuration, number and character, so long as the inserts comprise material having ray absorptive characteristics different from that of the material of the surrounding portions of the article. The present disclosure, however, for the purpose of demonstrating the invention, shows apparatus for examining articles 12 comprising rubber heels for shoes, the same consisting of a plate-like body 14 of usually molded plastic composition of rubber-like character, peripherally configurated to the conventional shape of a shoe heel and containing a series of inserts 13 comprising nail holding washers, usually of metal, embedded in and enveloped by the material of the body 14.

For convenience in applying a rubber heel on a shoe, it is desirable, if indeed not essential, that the nail holding washers comprising the inserts 13 be accurately located in properly spaced apart relation in the body 14, with the central opening of each washer in concentric alinement with nail receiving channels 15 produced in the body 14 during the formation thereof in the molding die, the position of the nail holes 15 in the finished product being thus accurately determined by action of the corresponding portions of the molding die. During the molding operation, however, one or more of the inserts 13 may become displaced from a desired position, such as the position 16, indicated in dotted lines in Figs. 4 and 6 of the drawings. In the finished article, such displaced washer may become embedded in the body 14 in a relatively shifted or offset position, as shown at 16', in which the central opening of the displaced washer is out of alinement with its corresponding nail hole 15. Accidental omission of the insert 13, as shown in dotted lines at 17, will also result in the production of a defective article 12.

Accordingly, it is exceedingly desirable, after the production of the article 12 in finished condition, to be able to determine whether or not the same contains all of the required inserts accurately disposed in desired or predetermined positions in the body 14, in order that articles containing incorrectly disposed inserts, or articles from which an insert or inserts have been entirely omitted, may be sorted from articles containing the correct number of correctly located inserts, whereby imperfect articles may be rejected and withheld from shipment; and the present invention provides exceedingly effective means well suited for examining articles of the character mentioned at relatively high rates of speed.

As shown more particularly in Fig. 1, articles 12 requiring inspection may be supported in fixed position at an inspection station 18. The inspection equipment may comprise a suitable source of penetrating rays, such as provided by a conventional X-ray tube 19, having a cathode and a cooperating anode adapted to constitute an X-ray source when energized by the impingement on the anode of electrons emitted by the cathode. The ray source 19 may be mounted on any suitable support means in position to direct a ray beam 20 through the article to be inspected and upon X-ray sensitive means 21, while the article under inspection is disposed in fixed position at the inspection station 18. The sensitive means may thus be irradiated by the beam 20 only after the same has passed through the inspection article at the inspection station.

The intensity of the beam, as applied on the means 21, will of course be reduced by the amount of energy absorbed therefrom in passing through the article being inspected. Those portions of the beam, which traverse the inserts 13, will impinge upon the means 21 at intensities different from those portions of the ray beam which impinge upon the means 21 after passing through the body 14 of the article outwardly of the inserts. Such X-ray intensity differential is utilized in the present invention to discriminate between perfect articles, in which all of the inserts are correctly placed, and imperfect articles, in which one or more of the inserts are either entirely missing or occupy positions in the body 14 other than a desired or predetermined position therein. To this end, the sensitive means 21 may comprise a screen or grid embodying X-ray sensitive semi-conductor material disposed in the screen in a predetermined pattern corresponding with the desired arrangement pattern of inserts in a perfect article. The X-ray sensitive semi-conductor material, comprising the screen means 21, may be controllingly connected with translation circuit means 22 in order to control the selective operation of any suitable or desired mechanism for indicating whether or not an article being examined contains correctly placed inserts therein; such mechanism thus serving to differentiate perfect from imperfect articles.

The ray sensitive material utilized in the screen 21 preferably comprises a crystal or crystals of a suitable ray sensitive semi-conductor, such as the sulphide of cadmium or mercury, or cadmium selenide. For the purpose of explaining the present invention, a semi-conductor may be defined as a substance having electrical resistance or reactance, or both, which vary in accordance with the intensity of rays to which the substance is exposed, the combined electrical resistance and reactance being commonly referred to as the impedance of the conductor. The sulphides of cadmium and mercury, and cadmium selenide, in this respect, have been found to be semi-conductors usefully sensitive to X-rays, the same, in the absence of X-rays, having impedance characteristics of such high order as to constitute the same as virtual insulators capable of preventing the flow of electrical energy therethrough. The electrical characteristics of the named materials are such that the impedance thereof progressively declines or becomes reduced in proportion to the intensity of X-rays impinging thereon, and, as more fully explained in copending application Serial No. 190,801, filed October 18, 1950, now Patent No. 2,706,790, and Serial No. 232,073, filed June 18, 1951, now Patent No. 2,706,791, the intensity of impinging X-rays may be accurately gauged in terms of the apparent impedance of the sensitive semi-conductor material.

The named semi-conductors may also be distinguished from commonly known semi-conductors in that they exhibit current amplifying characteristics when irradiated with X-rays. Semi-conductors operate as such through the release of electrons, entrapped therein, when subjected to energy rays to which sensitive. Commonly known semi-conductors, such as selenium, none of which are to any appreciable or useful extent sensitive to penetrating rays, such as X-rays, operate to release electrons in direct proportion to changes in the electrical space charge of the material, as the result of ray impingment thereon, and thus do not show current amplifying characteristics. The sulphides of cadmium and mercury, however, as well as the selenide of cadmium, release many thousands or hundreds of thousands of electrons in response to unit alteration of the space charge therein, when excited by penetrating rays, such as X-rays, to which said materials are sensitive. Each crystal of the sensitive material thus, in effect, comprises a tiny amplifier capable of delivering a substantial quantity of electrical current when excited by X-rays.

It is thought that the amplifying character of the crystals is due to the fact that cadmium and mercury sulphide and cadmium selenide comprise what may be called excess electron or electron donor semi-conductors, the excess energy necessary to produce amplified currents in the crystal being derived from the electron producing character of the material itself, when irradiated or triggered by exposure to X-rays. It is suggested that electron donor centers in each crystal become ionized by the impinging X-rays, thus forming stationary positive space charges in the material. The amplifying character of these electron donor materials can be compared to that of a conventional triode tube where the grid is assumed to be floating. In such a tube the grid takes up a negative charge as the result of electron flow therein, thus reducing the plate current to a small value. If the grid of such a tube is charged positively, the current flow therein will materially increase. In electron donor type of crystal material, the conduction electrons are, to a large extent, localized in traps, thus forming a current reducing, stationary, negative space charge. Upon ray impingement on the crystal, its electron donor centers become ionized, thus assuming positive charges. These stationary positive charges are thought to act in the same way as do positive charges on the grid of a triode tube. One positive hole, or center, so established in the crystal, appears to control the flow of more than ten thousand electrons in the crystal. This is in contradistinction to the action of ordinary photosensitive conductors, such as selenium, where this amplification mechanism is absent. As a consequence, electrical energy is released in the electron donor type of crystal material in the form of crystal current that is many times the energy applied to the crystal by the exciting ray, the action being such as to render these electron donor semi-conductors detectably sensitive to X-rays.

In the absence of rays to which responsive, the semi-conductor material in the screen 21 may have impedance characteristics of such high order as to constitute the material as a virtual insulator capable of substantially preventing the flow of electrical current therethrough. When irradiated with rays to which it is sensitive, the impedance of the semi-conductor material may be reduced as a proportional function of incident ray intensity so that the material becomes electrically conducting in proportion to the intensity of exciting rays impinging thereon. As a consequence, such ray induced or controlled change in the impedance of the semi-conductor material may be measured to indicate and thus detect the presence of an impinging ray.

The effective impedance of the semi-conductor, of course, may be determined by applying a known voltage to the semi-conductor and measuring the resultant current flow therethrough. This may be accomplished by electrically connecting the semi-conductor in an impedance measuring circuit comprising the conductor, a voltage source and current flow measuring means such as a resistor, in which current flow may be determined in terms of voltage measured across the resistor. Measurement of such current flow determines the impedance of the semi-conductor and hence measures the intensity of the impinging ray. Alternately, such current flow may be employed to operate or to control the operation of any device desired to be caused to function in response to the impingement of the ray on the semi-conductor, or to changes in the intensity of the impinging ray, the same, as shown herein, being accomplished in the translation system 22.

The screen means 21 may comprise a support panel 23 carrying a ray sensitive semi-conductor element or elements 24 mounted thereon, comprising crystals of cadmium or mercury sulphide or cadmium selenide. The elements may be arranged in spaced relation forming spaced apart groups 24' of elements, on the panel 23, said groups being disposed in the panel in position forming a pattern corresponding with the arrangement pattern of the inserts 13 in the article to be examined. The panel 23 accordingly may be disposed at the examination station 18 in position such that the elements 24 of each group 24' may be screened from the rays 20 by the inserts 13 of an element 12 disposed in scanning position at the scanning station. In the event that the inserts of the scanned article 12 are correctly positioned therein, all of the elements 24 will be screened by such correctly positioned elements. If, however, any of the elements is missing or displaced from its desired or predetermined position in the scanned article, one or more of the elements 24 may be exposed to unscreened rays of the beam 20 which do not pass through the so-displaced or missing insert. The impedance of any element 24 thus exposed to unscreened rays will be measurably different as compared with its impedance when screened by correctly positioned inserts.

It will be understood, of course, that inspection of an insert may be accomplished either by arranging the crystals in position to be normally screened by a properly placed insert, in which case crystal displacement will be detected by reduction in the impedance of an unscreened crystal, or by arranging the crystals of a group in position immediately outwardly of the shadow cast by the insert, so that the crystals may be normally exposed to unscreened rays when the insert is correctly positioned. In such case one or more of the crystals may become screened with resultant increase of crystal impedance as the result of the presence of an incorrectly located insert in the examination article. It is preferable, however, under ordinary circumstances to arrange the crystals 24 in position to be normally screened by correctly positioned inserts.

The several elements 24, comprising a group of elements 24', are preferably arranged on the screen 23 in a pattern determined by the shape of the corresponding insert 13 in the examination article 12. Any desired or required number of crystals may thus be employed in a crystal group 24', depending upon the size and configuration of the corresponding insert to be detected, the crystals being preferably arranged in a pattern so that but slight displacement of the insert will expose one or more of the crystals of the group to rays 20 unscreened by passage through the insert.

The invention, of course, is not necessarily limited to the employment of a plurality of crystals 24. Where the insert to be detected is relatively small, it may be possible to utilize but a single accurately positioned crystal for detecting misplacement of a relatively small insert. Where the inserts to be detected comprise washers of the sort shown in the drawings, it is desirable to employ three crystals for the detection of each insert, said crystals 24 being preferably arranged radially in the manner shown in Fig. 8, with the outer active ends of the crystals disposed immediately within the margin 25 of the shadow cast by a correctly located insert in the article 12 when the same is in scanning position in the station 18. In this connection, as disclosed in the aforesaid copending applications for U. S. Letters Patent, the end of a sensitive element 24 which is electrically negative, in an impedance measuring circuit, is the active or sensitive end, irradiation of which by X-rays produces impedance changes in the element, irradiation of the element other than at such negatively connected end having little, if any, effect upon the impedance of the element.

The inner or inert ends of the crystals 24 of each group may be electrically connected with a common conductor 26. This may be accomplished by connecting said crystal ends with the head of a common conducting stud 27, on one side of the panel 23, as by means of a suitable conducting material 28, which may comprise a conducting paint comprising graphite. The stud 27 may extend through the panel 23 for electrical connection with the conductor 26 on the back of the panel. The outer or active ends of the crystal detector elements 24 may each be electrically connected with a corresponding stud 27' penetrating the panel 23 and electrically connected, on one side of the panel, with the outer or active end of the element, as by means of graphitic paint 28', or other suitable connection forming conductor means, the studs 27' being electrically connected with conductor means 29 for the electrical connection of the elements 24 with impedance measuring circuit means forming a part of the translation circuit 22. If desired, the conductor means 29 may be arranged to separately connect each of the elements 24 in separate measuring circuits, although, as shown, the elements 24 of each group 24' may be interconnected in parallel relationship by interconnecting the several conductors 29 of a crystal group with a common conductor 30.

As shown more particularly in Fig. 11, the conductors 26 of the several crystal groups 24' may be electrically interconnected in common with the electrically positive side 31 of a suitable power source 32, the other or negative side 31' of which is electrically connected with the sensitive ends of the crystal elements 24, preferably through resistance elements 33. The crystals of each crystal group are thus connected in a corresponding impedance measuring circuit. If desired, of course, each crystal element 24 through its connected conductor 29 may be connected with the side 31' of the power source through a corresponding resistor element; but, as shown in Fig. 11, the crystals of each group 24' are interconnected in common with the negative side of the power source through a corresponding group resistor 33. Accordingly, when all of the crystals 24 are irradiated by the beam 20, screened by the inserts 13, a corresponding voltage will be developed across each of the resistor elements 33. If any one or more of the crystal elements 24 be irradiated by portions of the beam 20, the impedance of such element or elements will decrease, thereby correspondingly increasing the voltage developed across the connected resistor 33, thereby indicating incorrect placement of an insert in position failing to screen an element 24.

The impedance measuring voltages thus developed across the resistors 33 may be employed in any suitable or preferred fashion to operate mechanism for indicating the presence, at the examination station, of an examination article 12 containing a misplaced insert or inserts. As shown, however, the translation system 22 comprises a load device 34 comprising the operating solenoid of a normally open switch 35, said solenoid being interconnected in series with a suitable power source, which as shown comprises the power source 32, and a series of electronic switches 36 connected in parallel for controlling the operation of the solenoid 34 by the power source. These switches 36 preferably comprise gas filled electron flow devices having each an anode or plate 37, a cathode 38, and a control grid 39, the cathodes 38 of the several switches 36 being commonly interconnected and electrically connected with the power source, the plates 37 of the several switches 36 being commonly interconnected and electrically connected with one side of the solenoid 34, the other side of said solenoid being connected preferably through a normally closed disabling switch 40 with the power source.

The switches 36 are of the sort which remain normally open so long as the potential on the control grids 39 thereof is held at or below a predetermined value, the switches being adapted to fire and hence close between the anodes and cathodes thereof whenever the voltage applied on the control grids thereof exceeds a predetermined firing value. After firing, the switches are adapted to remain in closed or current carrying condition between the anodes and cathodes thereof so long as operating power is supplied to the load device 34 from the power source through a switch 36, the present disclosure including a normally open clearing switch 41 connected in parallel relationship with the power source, so that, upon closure of the switch 41, any of the switches 36 then in fired or closed condition may be reset or opened.

In the event that any of the crystals 24 be exposed to rays of the beam 20 as the result of misplacement of an insert 13 in an examination object in scanning position at the station 18, the increased voltage developed in the connected resistor 33 will apply a firing voltage upon the grid of the corresponding tube switch 36. The consequent firing or closing of said switch 36 will energize the coil 34 to close the switch 35. The switch 35 may be connected in a circuit for the control of any desired operating device for marking, ejecting or otherwise discriminating a perfect from an imperfect examination object in the station 18.

As shown, the switch 35 may be interconnected for the control of a device 42 operable to mark the examination article 12 at the scanning station 18 in the event that the same contains incorrectly placed inserts 13. To this end, the marking device 42 may comprise a nozzle connected with a suitable source of marking pigment under pressure. The nozzle may embody a normally closed valve and a solenoid 43 for opening the valve when electrically energized, in order to allow a blob of pigment to be squirted through the nozzle upon the examination article 12 in response to the opening of the valve. The switch 35 may be connected in circuit with the solenoid 43 and a suitable source 44 of solenoid operating power to energize the solenoid upon closure of the switch 35 and thereby cause an imperfect examination object 12 to be marked.

As soon as the device 42 has operated to mark the article 12, it is, of course, desirable to disable the switch 36, the firing of which caused closure of the switch 35 and resultant operation of the marking device. To this end, the normally open clearing switch 41 may be provided with an operating solenoid 46 which may be connected in parallel relationship with the solenoid 43 to cause closure of the clearing switch in response to closure of the switch 35. The mechanism of the switch 41 may include time delay means 41', if desired or necessary, to assure closure of the switch 41 after operation of the marking device. Closure of the clearing switch 41 thus results in disabling the energizing circuit of the solenoid 34, thus opening the switch 35, and thereby discontinuing the operation of the marking device 42 and de-energizing the solenoid 46 of the switch 41, whereby to allow the same to return to its normally open position in which the translation system 22 is ready for operation.

Of course, if the inspection device 12 should remain in situ at the inspection station, the resetting of the system for operation might result in an immediate repeat operation upon the opening of the switch 41. Consequently, it is desirable to provide means, such as the normally closed disabling switch 40 and means to open the same after operation of the reject mechanism, to assure against a repeat operation of the mechanism in the event that the inspection device should remain in situ at the inspection station. Any suitable or preferred means may be employed for thus controlling the switch 40 which, if desired, may comprise an operating solenoid 40', to open the switch when energized. The solenoid 40', if desired, may be interconnected in parallel relation with the solenoid 43, to thereby disable the load circuit through the load device 34 upon operation of the reject device 42, the switch 40 remaining open until reclosed, either manually or automatically, upon the removal of the inspected article 12 from the inspection station, to thereby recondition the system for operation after a successive inspection article 12 shall have been positioned in the inspection station.

In this connection, it should be understood that inspection articles 12 can be manually delivered or arranged in position to be inspected at the inspection station, in which case it may be desirable to arrange for the manual closing of the switch 40. As shown, however, inspection articles 12 may be deposited in suitable conveyor means 45 for delivering inspection articles successively to and through the inspection station. The conveyor means 45 may comprise an endless element 46 carried on spaced wheels 47; and the element 46, where the inspection articles are rubber shoe heels, may comprise a series of carrying plates or links 48 pivotally interconnected, as by pivot pins 49 extending in lugs 50 and 50' at the opposite ends of the links, whereby to interconnect the links as an endless belt or chain. Each link 48 may be formed with a cavity or pocket 51 sized and shaped to snugly receive an inspection article 12. The wheels 47 may be formed to support the endless belt or chain comprising the links 48 at the opposite ends thereof, and rollers 52 may be provided for supporting the endless chain or belt intermediate the wheels 47, particularly at the inspection station 18.

The endless chain or belt 46 may be driven by the wheels 47 in intermittent fashion, to thereby allow each link 48 to remain stationary or dwell at the inspection station 18 and thus present an inspection article carried thereby, precisely in position for inspection in the X-ray beam 20, during an interval sufficient to allow inspection thereof. Inspection articles may be deposited in the pockets 51 of the chain 46 either manually or by suitable automatic delivery means, on one side of the inspection station; and means may be provided for discharging the inspected articles from the conveyor after inspection. As shown, the articles may remain on the conveyor and dropped therefrom by gravity as the links carrying the inspected articles pass around a wheel 47 at the end of the conveyor.

In order to assure the translation system 22 against false operation in the event that a link 48 becomes positioned at the inspection station 18 without carrying an article to be inspected, and to prevent false operation during the interval when a link is moving into or out of the inspecting station, means may be provided to render the system 22 inoperative except when an inspection article is in inspecting position at the inspection station 18. To this end, the solenoid 40' of the disabling switch 40 may be interconnected in a series circuit including a source of solenoid energizing power, such as the power source 44, said circuit including normally open switch means adapted to be closed only when an inspection article 12 is in position to be inspected at the inspection station.

As shown, such switch means may comprise a switch 53 disposed at the inspection station to be closed by an inspection article 12. In many applications, a single switch 53 may be employed to control the operation of the solenoid 40', where circumstances are such that the switch 53 can be arranged to close only when the inspection article is precisely located in inspecting position. Practical considerations, however, may require an additional switch 53' in series with the switch 53 to assure closure of the switch 40 to condition the translation system 22 for operation only when an inspection device is located precisely in inspecting position. As shown, the switch 53 is arranged to be closed by an inspection article 12 carried by a link 48, so that the system 22 may be conditioned for operation only if the link 48 contains an inspection article. Since the article 12 necessarily may fit the pocket 51 somewhat loosely, and since the shape of the article 12 may not lend itself to precise operation of the switch 53, the switch 53' may be disposed in position to be closed by a projection, such as the head of a pin 49 on the conveyor, only when the conveyor is in position precisely presenting the inspection article 12 in position to be inspected at the station 18. Accordingly, the switch 40 will remain open and the translation system 22 correspondingly inactive for the operation of the load device 34, except when the inspection article 12 is precisely located for inspection.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A screen for penetrating ray detection comprising means forming a support panel, a plurality of ray sensitive elements secured in spaced relation on said panel in position to register with and hence define the marginal edge of a ray shadow cast upon the panel by an inspection object in registration with the panel while the same is being irradiated by rays traversing said object, and connection means on the panel for electrically connecting said elements in electrical measuring circuits whereby to detect the presence of the inspection object in predetermined relative position with respect to said panel.

2. A screen for penetrating ray detection comprising means forming a support panel, three or more ray sensitive elements secured in spaced relation on said panel in position to register with and hence define the marginal edge of a ray shadow cast upon the panel by an inspection object in registration with the panel while the same is being irradiated by rays traversing said object, and connection means on the panel for electrically connecting said elements in electrical measuring circuits whereby to detect the presence of the inspection object in predetermined relative position with respect to said panel.

3. A screen for penetrating ray detection comprising means forming a support panel, a plurality of elongated ray sensitive elements secured in spaced relation on said panel, and means on the panel for electrically connecting said elements in electrical measuring circuits including a common contact on said panel, said elements extending radially outwardly of and having each an end electrically connected with said common contact, the ends of said elements remote from said contact extending in position to register with the marginal edge of a ray shadow cast upon the panel by an inspection object to thereby precisely define a desired position of said object with respect to the panel while the same is being irradiated by rays traversing said object.

4. A screen for penetrating ray detection comprising means forming a support panel, a plurality of elongated ray sensitive elements secured in spaced relation on said panel, each element having a ray detecting end disposed in position to register with the marginal edge of a ray shadow cast upon the panel by an inspection object to thereby precisely define a desired position of said object with respect to the panel while the same is being irradiated by rays traversing said object, the ray detecting ends of said elements being adapted for electrical connection with the negative side of a unidirectional electrical potential source to sensitize the same for ray detection, the other ends of said elements being electrically interconnected for connection with the positive side of said source.

5. A screen for penetrating ray detection comprising means forming a support panel, a plurality of spaced apart groups of ray sensitive elements secured in spaced relationship on said panel in position forming a predetermined pattern corresponding with a desired arrangement pattern of ray absorbing inserts in an examination object, each element group comprising elements disposed in spaced relation and in position to register with and thus define the marginal edge of a ray shadow cast by a said insert in desired relative position with respect to the panel, and connection means for electrically connecting said elements in electrical measuring circuits to detect the presence of said inserts precisely in desired position in an examination object disposed in registration with said panel while the same is being irradiated by rays traversing said object.

6. A screen as set forth in claim 5 wherein the elements of each group extend radially of a common contact disposed centrally thereof and electrically connected with one end of each element of the group.

7. A screen as set forth in claim 5 wherein each element group comprises three ray sensitive elements extending radially of a common centrally located contact with which one end of each of the three elements is electrically connected.

8. A screen as set forth in claim 5 wherein the elements of each group are connected at one end with a common centrally located contact adapted for connection with the positive side of a unidirectional electrical potential source, said elements being spaced apart to present the other ends thereof in position to register with spaced apart edge portions of an insert cast ray shadow, means being provided for connecting said other ends of the elements with the negative side of the potential source whereby to sensitize said other ends for the detection of said inserts in precisely desired position in the examination object.

9. A screen for penetrating ray detection comprising means forming a support panel, a plurality of ray sensitive elements secured in spaced relation on said panel in position to register with and hence define the marginal edge of a ray shadow cast upon the panel by an inspection object in registration with the panel while the same is being irradiated by rays traversing said object, and connections means on the panel for electrically connecting said elements in electrical measuring circuits whereby to detect the presence of the inspection object in predetermined relative position with respect to said panel, said ray sensitive elements comprising sensitive material of the crystalline class consisting of the sulphides of cadmium and mercury and the selenide of cadmium.

References Cited in the file of this patent

UNITED STATES PATENTS

| | | |
|---|---|---|
| 2,541,247 | Herr | Feb. 13, 1951 |
| 2,582,850 | Rose | Jan. 15, 1952 |
| 2,668,184 | Taylor et al. | Feb. 2, 1954 |

OTHER REFERENCES

An Economical Industrial X-Ray Detector, Frerichs et al., General Electric Review, August 1951, pp. 42–45.